United States Patent Office 3,075,347
Patented Jan. 29, 1963

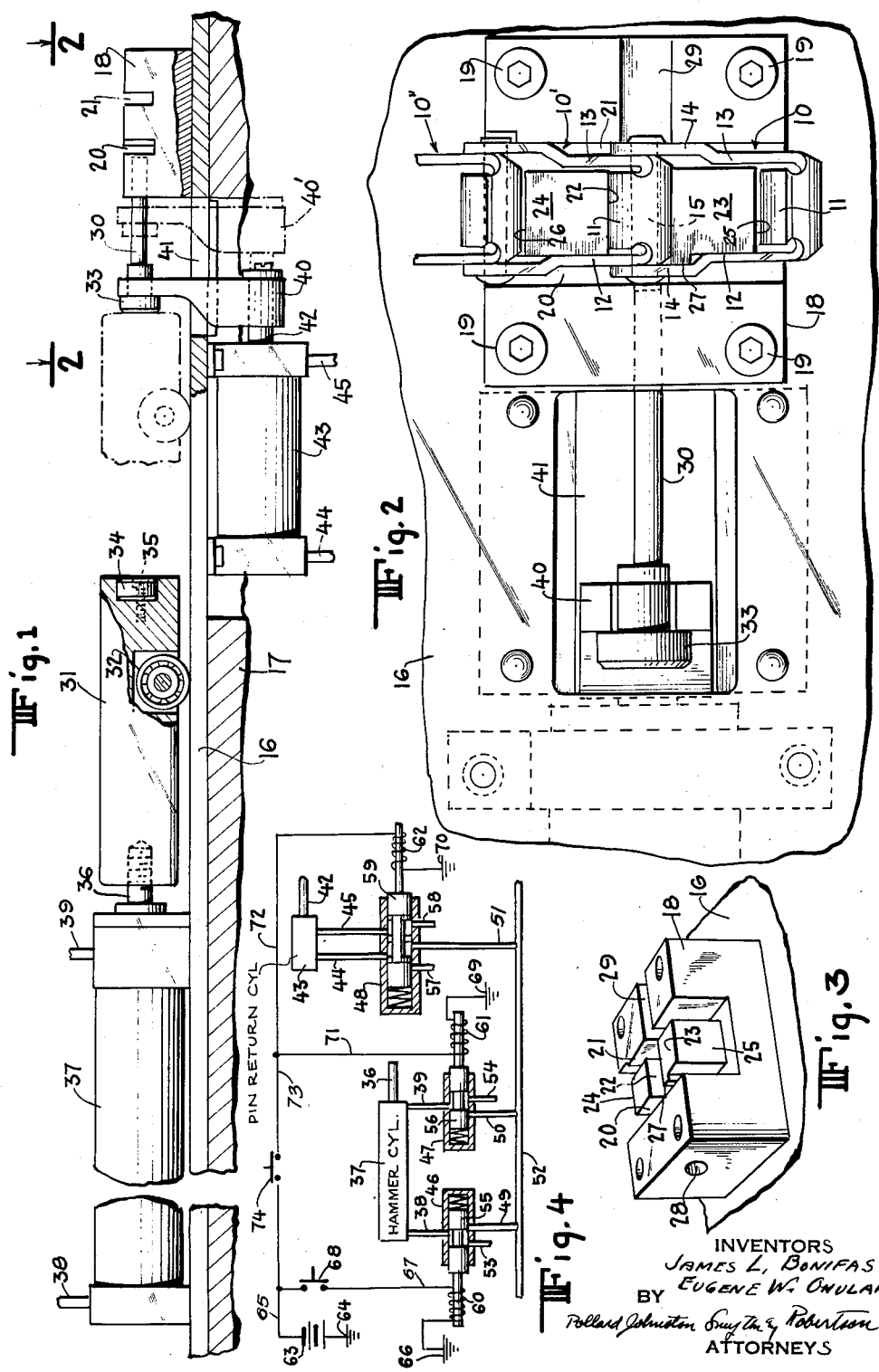

3,075,347
POWER OPERATED PIN REMOVING DEVICE HAVING AUTOMATIC MEANS FOR RETRACTING THE TOOL THEREOF
James L. Bonifas, Huntington, Ind., and Eugene W. Onulak, Trumbull, Conn., assignors to The Locke Steel Chain Company, Huntington, Ind., a corporation of Connecticut
Filed July 2, 1959, Ser. No. 824,609
4 Claims. (Cl. 59—7)

This invention relates to a device for removing the connecting pin holding together two adjacent links of a chain and, more particularly, is directed to a device for the described purpose which is power operated.

The power operated pin removing device embodying the invention is particularly adapted for use with a chain constructed of identical links of the type disclosed in United States Letters Patent No. 2,793,536, and wherein each link is an integral unit having two generally parallel legs connected by a cylindrical bushing extending between the base portions of the legs. The free ends of the legs are preferably offset away from each other and have openings therein so that a pin may be passed through the openings at the free ends of the legs of one link and through the bushing of an adjacent link to provide a pivotal connection between the two links. Any number of the links may be successively assembled together in the above described manner to form a chain of suitable length.

In chains formed of links of this type, it is sometimes necessary to remove one or more of the links from the chain, either for the purpose of replacing a link that has failed or for the purpose of decreasing the length of the chain. It is necessary that bending, distorting, or otherwise damaging the parts of the links be avoided during the removal of a pin holding adjacent links together, and that the legs of each link be maintained in their original relationship to each other following the removal of the pin so that a new pin can be easily inserted for reassembling the chain and there is no decrease in the strength of the reassembled chain.

It is an object of this invention to provide a power operated device for removing or knocking out the pin holding together two adjacent links, while avoiding distortion of the parts of the links.

A further object is to provide a power operated device of the described character having a one-piece supporting member or block which is adapted to receive two adjacent links of a chain and to give support to such adjacent links during the removal of the connecting pin therebetween so that such removal can be effected without distorting the parts of the links.

The power operated pin removing device embodying the invention generally includes a supporting block or member having two parallel, spaced apart slots in its upper surface and a connecting slot extending laterally between the parallel slots intermediate the ends of the latter so that the legs of two adjacent connected links can be received by the parallel slots while the cylindrical bushing with the connecting pin extending therethrough are received in the connecting slot. A knockout member is axially slidable in a bore formed in the supporting block in alignment with the connecting slot and is adapted, when displaced in one direction, to travel along the connecting slot and thereby act against the connecting pin holding together the adjacent links which are simultaneously supported by the block so that the head at one end of the connecting pin is sheared off and the pin is removed from the associated legs and bushing of the links while avoiding distortion of the latter.

In a power operated pin removing device embodying the invention, the reciprocable knockout member is in the form of a plunger having a head at one end disposed outside of the supporting block and adapted to be driven in the direction for removing the pin holding together adjacent links by means of a fluid pressure operated hammer, while the plunger is returned in the opposite direction to a retracted position, where it is withdrawn from the slot of the supporting block, by means of a fluid pressure operated return member which is adapted to act upon the head of the plunger and is disposed at an inactive position remote from the head of the plunger during the operative or knockout stroke of the latter so as to avoid interference with such operative stroke.

According to a further aspect of this invention, the fluid pressure operated hammer and return member are controlled in a manner to effect the return movement of the hammer simultaneously with the return movement of the knockout plunger in order to dispose the hammer in a position where it is remote from the head of the plunger and poised to again strike such head, while the disposition of the return member in the above mentioned inactive position remote from the the head of the plunger is ensured during the operative stroke of the hammer against the plunger.

The above, and other objects, features and advantages of the invention, will be apparent in the fol owing detailed description of an illustrative embodiment thereof which is to be read in connection with the accompanying drawing forming a part hereof, and wherein:

FIG. 1 is a side elevational view of a power operated pin removing device embodying the invention, with such device being shown partly broken away and in section;

FIG. 2 is an enlarged, fragmentary top plan view of a portion of the device illustrated in FIG. 1, as the same appears when viewed in the direction of the arrows 2—2 on FIG. 1;

FIG. 3 is a perspective view of a supporting member or block included in the device of FIG. 1; and FIG. 4 is a schematic and wiring diagram of a system for controlling the operation of the device of FIG. 1.

Referring to the drawing in detail, and initially to FIG. 2 thereof, it will be seen that the power operated pin removing device embodying the invention is particularly adapted for use with a chain formed of links 10, 10' and 10'' of the type disclosed in United States Letters Patent No. 2,793,536. Each of the links 10, 10' and 10'' includes a generally cylindrical bushing 11 and a pair of generally parallel legs 12 and 13 extending from the opposite ends of the bushing at right angles to the axis of the latter. The free end portions of the legs 12 and 13 are offset away from each other, as at 14, and have axially aligned bores therein, and additional bores are formed in the legs in axial alignment with the related bushing 11 so that a pin 15 may be passed through the bores adjacent the free ends of the legs of one link 10 and through the bushing 11 and aligned bores in the legs of another link 10' in order to provide a pivotal connection between the two identical links 10 and 10'. The pin 15 preferably has heads at its opposite ends in order to prevent its inadvertent removal from the two adjacent links pivotally connected thereby.

As shown in FIG. 1, a power operated pin removing device embodying this invention includes a generally horizontal support or base plate 16 maintained at a suitable elevation by a frame 17, and having a supporting member or block 18 removably secured on its upper surface, for example, by the bolts or screws 19 (FIG. 2) which extend through vertical bores in the block 18 into threaded engagement with tapped holes provided in base plate 16.

The block 18 has two parallel, spaced apart slots 20 and 21 opening upwardly at the top surface of the block and also opening at their opposite ends, and a connecting slot 22 extends between the parallel slots 20 and 21 intermediate the opposite ends of the latter and also opens upwardly at the top surface of block 18. Thus, the arrangement of the slots 20, 21 and 22 generally resembles the configuration of an H, with islands or abutments 23 and 24 being defined by the top portions of block 18 located between the opposite end portions of the slots 20 and 21 and the slot 22. Further, the ends of islands 23 and 24 which are remote from each other may be cut away as at 25 and 26, respectively (FIG. 2), to define recesses extending laterally between the ends of the parallel slots 20 and 21. It will also be seen that the island 23 has a projection 27 extending into slot 20 at the intersection of that slot with the connecting slot 22.

The slots 20, 21 and 22 have a depth that is approximately equal to the width of the legs 12 and 13 of each link 10, while the connecting slot 22 is dimensioned so that, as shown in FIG. 2, the bushing 11 of a link 10′ containing a pin 15 which is to be removed easily fits in the connecting slot 22 with a minimum clearance between such bushing portion and the adjacent surfaces of islands 23 and 24 defining the sides of slot 22. Further, as seen in FIG. 2, the slots 20 and 21 are related to the connecting slot 22 so that, when a bushing 11 is disposed in the latter, as described above, the legs 12 and 13 of the adjacent links 10 and 10′ connected by the pin 15 which is to be removed are disposed within the parallel spaced apart slots 20 and 21.

Supporting block 18 further has a bore 28 extending perpendicular to slot 20 and opening from the latter to the adjacent parallel side wall surface of the block, with the bore 28 being disposed so as to be in axial alignment with the pin 15 within the bushing 11 disposed in connecting slot 22, and a further slot 29 is formed in the upper surface of block 18 and extends at right angles away from slot 21 in alignment with the connecting slot 22.

As seen in FIG. 2, when the legs 12 and 13 of adjacent links 10 and 10′ connected by the pin 15 which is to be removed are disposed in the parallel slots 20 and 21, the leg 12 of link 10′ bears against the side wall surface of island 24 extending along slot 20 while leg 12 of the adjacent link 10 bears against the confronting side wall surface of island 23 and has its offset end portion 14 bearing against the projection 27 of island 23. At the same time, the offset portion 14 of the opposite leg 13 of link 10 bears against the side wall surface of groove 21 remote from the islands 23 and 24 adjacent the opening of slot 29 into slot 21, whereby the legs 12 and 13 of both adjacent links 10 and 10′ are firmly supported against lateral movement in the direction toward the slot 29, at least in the region of the pin 15 which is to be removed.

It will also be noted that the bushing 11 of link 10 and the bushing of the link 10″ connected to the link 10′ are disposed in the lateral recesses defined by the cutouts 25 and 26, respectively.

Since the various slots formed in the supporting block 18 are dimensioned and arranged with respect to each other in order to accommodate links of a particular size, it is intended that several of such blocks having differently dimensioned slots should be on hand for interchangeable mounting on the base plate 16 so as to accommodate the pin removing device for use in connection with chains formed of differently sized links.

The bore 28 of block 18 has a reciprocable pin knockout member 30 slidable therein and which is preferably in the form of a cylindrical plunger with a diameter either equal to, or only slightly less than the diameter of the shank of the pin 15 which is to be removed.

During the placement of the links 10 and 10′ in the slots 20, 21 and 22 of block 18, the knockout plunger 30 is disposed in the retracted position illustrated in FIG. 2 where its inner end is within the bore 28 of the supporting block so as to avoid interference with the described placement of the links. When knockout plunger 30 is driven toward the right from the retracted position of FIG. 2, the inner end of the plunger first strikes the head at the adjacent end of the pin 15 and shears off the peripheral portion of the head extending beyond the margin of the bore in the free end portion of leg 12 of link 10 and then continues its travel through the aligned bores of the legs 12 of links 10 and 10′, the bushing 11 of link 10′ and the aligned bores of legs 13 of both links in order to drive the pin 15 into the slot 29 of block 18. Thus, the pin 15 pivotally connecting link 10 to link 10′ is completely removed and, since both legs of each of the links are firmly supported by block 18 against movement in the direction of the operating or knockout stroke of plunger 30, the removal of the pin 15 is effected without bending or distorting the legs of the links.

In accordance with the present invention, both the operating or knockout stroke of the plunger 30 from the retracted position of FIG. 2 and the return stroke of the plunger back to that retracted position following the removal of a pin are effected by power, preferably fluid pressure operated means. Thus, as shown in FIG. 1, the operating or knockout stroke of plunger 30 is effected by a hammer or striking mass 31 having ball bearing rollers 32 riding on the top surface of base plate 16 and being movable along a rectilinear path which is aligned with the axis of plunger 30. The knockout plunger 30 has an enlarged head 33 at its outer end to receive the impact of the hammer 31 when the latter is displaced rapidly from the position illustrated in full lines on FIG. 1 to the position there shown in broken lines, and the end of the hammer 31 facing toward plunger 30 has a hardened insert 34 for contact with the head 33. The hardened insert 34 is preferably removably secured to the hammer 31, as by a screw 35, so that the hardened insert can be replaced when it becomes excessively mutilated due to the repeated impacts against the head of plunger 30.

The end of hammer 31 facing away from plunger 30 is connected to the ram or piston rod 36 of a double acting, fluid pressure operated cylinder 37. The connection between hammer 31 and ram 36 may be provided by forming the hammer with an axially opening tapped bore which threadably receives a threaded end portion of the ram. It will be apparent that, when fluid under pressure, for example, compressed air, is admitted to the end of the cylinder 37 remote from hammer 31 through a pipe or tube 38, and the opposite end of the cylinder is vented to the atmosphere by way of a pipe or tube 39, the piston of cylinder 37 is driven toward the right, as viewed in FIG. 1, and thereby drives hammer 31 against the head 33 of plunger 30 in order to effect the operative or knockout stroke of plunger 30. On the other hand, when fluid under pressure is admitted to cylinder 37 through pipe 39 while pipe 38 is open to the atmosphere, the hammer 31 is moved in its opposite direction for return to its inactive or rest position shown in full lines in FIG. 1.

In order to effect the return of plunger 30 to its retracted position shown in full lines on FIG. 1, there is further provided a return member 40 which projects upwardly through an elongated aperture 41 in base plate 16 and which, at its lower end, is secured to the ram or piston rod 42 of a double acting, fluid pressure operated cylinder 43. The upper end of return member 40 is bifurcated and loosely embraces knockout plunger 30, but the distance between the legs formed by the upper bifurcated end of return member 40 is smaller than the diameter of head 33 of the knockout plunger so that the head 33 of plunger 30 and the upper end of return member 40 constitute a lost-motion connection between the plunger and the return member 40 whereby the latter is adapted to act against the head 33 in the direction for returning plunger 30 to its retracted position.

It is apparent that, when fluid under pressure, for example, compressed air, is admitted to cylinder 43 at the end of the latter remote from return member 40 by way of a pipe or tube 44, while a pipe or tube 45 extending from the opposite end of cylinder 43 is connected or vented to the atmosphere, the piston of cylinder 43 is driven toward the right, as viewed in FIG. 1, to move return member 40 to an inactive position shown in broken lines and identified by the reference numeral 40'. When the return member is in its inactive position 40' and the plunger 30 is in its retracted postion, the distance between the head 33 and the upper bifurcated end of the return member is at least as large as the operative or knockout stroke of the plunger 30 so that the return member, in its inactive position, will not interfere with the action of plunger 30 in removing the pin 15 connecting two adjacent links. However, if after the operative or knockout stroke of plunger 30 fluid under pressure is admitted to cylinder 43 by way of the pipe 45 while the pipe 44 is connected or vented to the atmosphere, the resulting movement of the return member from its inactive position 40' to the position shown in full lines on FIG. 1 will cause the return member 40 to act against the head 33 of plunger 30 for returning the latter to its retracted position.

The power operated pin removing device embodying this invention is preferably provided with a control system which ensures that the return member will be disposed in its inactive position 40' whenever the cylinder 37 drives the hammer 31 in the direction for effecting the knockout stroke of the plunger 30. Thus, as shown in FIG. 4 by way of example, a suitable control system may include solenoid operated valves 46 and 47 connected to the pipes 38 and 39, respectively, leading to the opposite ends of the hammer operating cylinder 37, and a solenoid operated valve 48 connected to the pipes 44 and 45 leading to the opposite ends of the pin return cylinder 43. The valves 46, 47 and 48 are connected, by way of pipes 49, 50 and 51, respectively, to a line or manifold 52 which supplies compressed air from a suitable source (not shown). Further, the valves 46 and 47 are provided with ports 53 and 54 respectively, opening to the atmosphere, and also with valve members or slides 55 and 56, respectively, which are reciprocable in the related valve bodies in order to establish communication between the pipe 38 and either the vent 53 or the pipe 49 and between the pipe 39 and either the vent 54 or the pipe 50.

The valve 48 is provided with two ports 57 and 58 opening or vented to the atmosphere, and with a valve member or slide 59 which is reciprocable in the valve body so as to establish alternative communication of the pipes 44 and 45 with the supply pipe 51 and with the vent ports 57 and 58, respectively.

The valve members or slides 55 and 56 are spring loaded so that, when the coils 60 and 61 of the related solenoid operated valves are deenergized, such valve members normally occupy positions establishing communication between the pipe 38 and the vent port 53 and between the pipe 39 and the vent port 54, respectively. On the other hand, when coil 60 is energized, valve member 55 is displaced toward the right, as viewed in FIG. 4, to establish communication between the compressed air supply pipe 49 and the pipe 38 and, similarly, when the coil 61 is energized, the valve member 56 is displaced toward the left, as viewed in FIG. 4, to establish communication between the compressed air supply line 50 and the pipe 39.

The valve member 59 of solenoid operated valve 48 is also spring loaded so that, when the coil 62 of that valve is deenergized, the valve member 59 occupies a position, as shown in FIG. 4, wherein pipe 44 communicates with the compressed air supply pipe 51 and pipe 45 communicates with the related vent port 58. However, when coil 62 is energized, valve member 59 is displaced toward the left, as viewed in FIG. 4, to a position where communication is established between the pipe 45 and the compressed air supply pipe 51 and between the pipe 44 and the related vent port 57.

From the above, it is apparent that the operative stroke of the hammer operating cylinder 37 occurs when the coil 60 of valve 46 is energized while the coil 61 of valve 47 remains deenergized, and that, conversely, the return stroke of the hammer operating cylinder 37 occurs when the coil 61 of valve 47 is energized and the coil 60 of valve 46 is deenergized. It is also apparent that, so long as the coil 62 of solenoid operated valve 48 is deenergized to connect pipe 44 with the supply of compressed air while pipe 45 is communicated with the atmosphere, the pin return cylinder 43 will maintain the return member in its inactive position 40'. On the other hand, when coil 62 is energized so that compressed air is supplied to cylinder 43 by way of pipe 45 and pipe 44 is communicated with the atmosphere, the return stroke of member 40 is effected for moving plunger 30 back to its retracted position.

Further, as shown in FIG. 4, the energizing circuit for the solenoid operated valves 46, 47 and 48 includes an electrical source 63 which, at one side may be connected to ground, as at 64, while its opposite side is connected to an electrical supply conductor 65. One end of coil 60 is grounded, as at 66, while the opposite end of coil 60 is connected to supply conductor 65 by way of a conductor 67 having a normally open push button switch 68 interposed therein in series with coil 60 so that the latter is energized only when push button switch 68 is manually or otherwise actuated.

One end of each of the coils 61 and 62 is grounded, as at 69 and 70, respectively, while the opposite ends of the coils 61 and 62 are connected in parallel, by conductors 71 and 72, respectively. The junction of conductors 71 and 72 is connected to electrical supply conductor 65 by way of a conductor 73 having a normally open push button switch 74 interposed therein so that the coils 61 and 62 are normally deenergized and are simultaneously energized only when switch 74 is manually or otherwise actuated.

With the described control system, the normally open condition of switch 74 ensures that the return member 40 will be disposed in its safe inactive position 40' (FIG. 1) when switch 68 is closed to cause compressed air to enter cylinder 37 for effecting the operative stroke of hammer 31 and consequently the knockout stroke of plunger 30. Following the removal of a pin 15 from adjacent links 10 and 10' by such knockout stroke of the plunger 30, switch 68 is released to return to its normally open condition and switch 74 is closed to cause the valves 47 and 48 to supply compressed air to the cylinders 37 and 43, respectively, in the directions for returning the hammer 31 to its inoperative position shown in FIG. 1, and for effecting the return stroke of plunger 30 to its retracted position. Thereafter, when switch 74 is released, the consequent deenergizing of coil 62 of valve 48 permits the return of valve member 59 to the illustrated position wherein compressed air is supplied to cylinder 43 in the direction for moving return member 40 to its inactive position 40' (FIG. 1) so that the power operated pin removing device is then in condition for removal of the separated links 10 and 10' from the supporting block 18 and in condition for a repeated operation.

From the above detailed description of an illustrative embodiment of the invention, it will be seen that a power operated device has been provided for effecting the removal of the connecting pins between adjacent chain links of the type described in this specification while avoiding distortion or bending of such links.

Although a particular embodiment of the invention has been described in detail herein with reference to the accompanying drawing, it is to be understood that the invention is not limited to that precise embodiment, and that various changes and modifications may be effected therein without departing from the scope or spirit of the invention except as defined in the appended claims.

What is claimed is:

1. A device for removing the connecting pin holding together two adjacent links of a chain, comprising supporting means, means on said supporting means for accommodating the two links held together by the pin which is to be removed, a knockout member slidably carried by said accommodating means and movable from a retracted position spaced from the links accommodated by the accommodating means through a knockout stroke during which said knockout member removes the pin holding together the links accommodated by said accommodating means, a hammer member mounted on said supporting means and movable toward said knockout member to strike the latter and cause said knockout stroke, first power operated means for effecting movement of said hammer member toward said knockout member in order to cause said knockout stroke of the latter and movement of said hammer member away from said knockout member to permit return of the latter to said retracted position, a return member mounted on said supporting means and movable back and forth parallel to said knockout member, means on said knockout member and said return member constituting a lost-motion connection therebetween for said back and forth movement, said lost-motion connection having a play which is at least as large as said knockout stroke so that said return member can be moved independently of said knockout member in the direction of said knockout stroke to an inactive position at the limit of said play where said return member avoids interference with said knockout stroke and can be moved in a direction opposite that of said knockout stroke to a position at which said knockout member is in said retracted position, second power operated means for effecting movement of said return member to and from said inactive position, control means connected to both of said power operated means and causing the movement of said return member to said inactive position before the movement of said hammer member producing said knockout stroke and the movement of said return member away from said inactive position for effecting the return of said knockout member to said retracted position simultaneously with the movement of said hammer member away from said knockout member, said control means including electro-magnetically operated valve means for each of said power operated means, and electrical circuit means for controlling said valve means and having first and second switches, said first switch when actuated rendering effective said valve means associated with said first power operated means to cause said knockout stroke, and said second switch in one condition allowing said valve means associated with said second power operated means to be rendered effective to effect movement of said return member to said inactive position and in another condition rendering effective said valve means associated with said second power operated means for effecting the return of said knockout member to said retracted position and, simultaneously, rendering effective said valve means associated with said first power operated means for moving said hammer member away from said knockout member.

2. A device for removing the connecting pin holding together two adjacent links of a chain as in claim 1; wherein said accommodating means includes a solid block having an arrangement of upwardly opening slots therein to receive the two adjacent links held together by the pin which is to be removed, and also having a bore opening into said arrangement of slots in axial alignment with the pin to be removed; and wherein said knockout member is in the form of an elongated plunger slidable axially in said bore to extend into said arrangement of slots during said knockout stroke.

3. A device for removing the connecting pin holding together two adjacent links of a chain as in claim 1; wherein said knockout member is in the form of an axially reciprocable plunger projecting, at one end, from said accommodating means; and wherein said means constituting a lost-motion connection includes an enlarged head on said one end of the plunger and a portion on said return member loosely embracing said plunger between said head and said accommodating means.

4. A device for removing the connecting pin holding together two adjacent links of a chain, comprising supporting means, means on said supporting means for accommodating the two links held together by the pin which is to be removed, a knockout member slidably carried by said accommodating means and movable from a retracted position spaced from the links accommodated by the accommodating means through a knockout stroke during which said knockout member removes the pin holding together the links accommodated by said accommodating means, a hammer member mounted on said supporting means and movable toward said knockout member to strike the latter and cause said knockout stroke, first power operated means for effecting movement of said hammer member toward said knockout member in order to cause said knockout stroke of the latter and movement of said hammer member away from said knockout member to permit return of the latter to said retracted position, a return member mounted on said supporting means and movable back and forth parallel to said knockout member, means on said knockout member and said return member constituting a lost-motion connection therebetween for said back and forth movement, said lost motion control connection having a play which is at least as large as said knockout stroke, so that said return member can be moved independently of said knockout member in the direction of said knockout stroke to an inactive position at the limit of said play where said return member avoids interference with said knockout stroke and can be moved in a direction opposite that of said knockout stroke to a position at which said knockout member is in said retracted position, second power operated means for effecting movement of said return member to and from said inactive position, control means connected to both of said power operated means and causing the movement of said return member to said inactive position before the movement of said hammer member producing said knockout stroke and the movement of said return member away from said inactive position for effecting the return of said knockout member to said retracted position simultaneously with the movement of said hammer member away from said knockout member, said first and second power operated means including first and second fluid pressure actuated cylinders, respectively, each having a ram which is reciprocated in response to the admission of fluid under pressure to the opposite ends of said cylinders, said control means including means for supplying fluid under pressure to the opposite ends of said first and second cylinders, electro-magnetically operated valve means interposed in said means for controlling the supply of fluid under pressure to said cylinders, and electrical circuit means for controlling said electro-magnetically operated valve means and having first and second switches, said first switch, when actuated, rendering effective a valve for admitting fluid under pressure to said first cylinder to effect the movement of said hammer member toward said knockout member, and said second switch when alternately in one condition allowing a valve to be rendered effective for admitting fluid under pressure to said second cylinder to effect movement of said return member to said inactive position, said second switch alternately in the other condition rendering effective a valve to cause admission of fluid under pressure to said second cylinder in the direction for effecting the return of said knockout member to said retracted position and, simultaneously, to render effective another valve to cause admission of fluid under pressure to said first cylinder in the direction for moving said hammer member away from said knockout member.

References Cited in the file of this patent

UNITED STATES PATENTS

| | | |
|---|---|---|
| 1,311,540 | Thomas | July 29, 1919 |
| 1,386,372 | Singer et al. | Aug. 2, 1921 |
| 1,542,711 | Loeven | June 16, 1925 |
| 1,602,901 | Hansen | Oct. 12, 1926 |
| 2,825,405 | Barley | Mar. 4, 1958 |
| 2,904,955 | Kreiter | Sept. 22, 1959 |

FOREIGN PATENTS

| | | |
|---|---|---|
| 21,097 | Great Britain | Oct. 1, 1903 |

UNITED STATES PATENT OFFICE
CERTIFICATE OF CORRECTION

Patent No. 3,075,347 January 29, 1963

James L. Bonifas et al.

It is hereby certified that error appears in the above numbered patent requiring correction and that the said Letters Patent should read as corrected below.

Column 8, line 5, for "in" read -- for --; column 10, after line 7, under "UNITED STATES PATENTS", insert the following:

2,825,404 Barley ----------Mar. 4, 1958 column 10, line 8, for "Barley" read -- Maass et al. --.

Signed and sealed this 17th day of September 1963.

SEAL)
Attest:

RNEST W. SWIDER
Attesting Officer

DAVID L. LADD
Commissioner of Patents